Oct. 29, 1935.  J. A. WATSON  2,019,282

LUBRICATING DEVICE

Filed April 28, 1933

INVENTOR.

John A. Watson

Patented Oct. 29, 1935

2,019,282

UNITED STATES PATENT OFFICE 2,019,282

LUBRICATING DEVICE

John A. Watson, Hinsdale, Ill., assignor to The Lubrication Corporation, Chicago, Ill., a corporation of Delaware Application April 28, 1933, Serial No. 668,376

10 Claims. (Cl. 285—161)

This invention relates to improvements in lubricating devices and more particularly to lubricant discharge nozzles of the type adapted to engage with and clamp tightly upon a lubricant receiving fitting while maintaining a leak-proof seal therewith regardless of the pressure put upon the lubricant.

One object of the invention is to provide a lubricant discharge nozzle which may be clamped upon any lubricant receiving fitting of the type having a cylindrical side wall merely by slipping the nozzle over the end of the fitting with or without an accompanying rotary movement of the nozzle about its axis relative to the fitting.

Another object is to provide a lubricant discharge nozzle, of the type described, whereby clamping and interlocking engagement between the nozzle and the fitting is effected by friction through the medium of an instrumentality having a function approximating that of an infinite wedge.

A further object is to provide a clamp type lubricant discharge nozzle wherein the clamping forces of the nozzle acting upon the fitting are caused to increase with an increase in the lubricant pressure to which the fitting is subjected, in fact to increase with almost any force tending to separate the fitting and nozzle.

Other objects, the advantages, and uses of the invention will be, or should become, apparent after reading the following specification and claims, and after consideration of the drawing forming a part of this specification in which:

In general the lubricant discharge nozzle selected for illustration herein includes a tubular body A communicating through a union or connector B with a lubricant conducting flexible hose C through which lubricant may be passed from a suitable source of supply, such as a portable or stationary lubricant pump or compressor. The forward end of the body A may be bored to a suitable internal diameter as shown at D to admit, with slight clearance, the cylindrical heads of lubricant receiving fittings such, for instance, as those shown in Figures 4 and 5. A plurality of steel balls E, located within bores in the side walls of the body A, are provided frictionally to engage with and secure the nozzle or coupler to the head of a fitting within the bore of the nozzle by a wedging action, and a lubricant pressure operated piston-washer F, adapted to be urged into engagement with the outer end of the fitting, may be provided to form a lubricant tight seal between the nozzle and fitting about its inlet port.

It will be observed that the balls E are disposed within bores 11 each of which has its axis inclined in two directions with respect to the axis of the nozzle or coupler A, particularly the forward part of the nozzle into which the fitting is to be received. Each bore is formed to intersect the bore D as indicated at 14 and to receive a ball E with reasonable clearance so that the ball may roll in the bore and become engaged with a fitting wall when the fitting is disposed within the nozzle. The angle of intersection of the axis of the bore 11 (viewing Fig. 3) preferably may be from 10° to 25° measured from a tangent perpendicular to a line intersecting both the axis of the bore D and the center of the aperture 14 through which the ball E may partially enter the bore D. Of course other arrangements may be made, but, with the form illustrated the balls may engage and tightly wedge against different or similar fittings having external diameters "over" and "under" the relative external diameter of the fittings shown.

Figure 1:
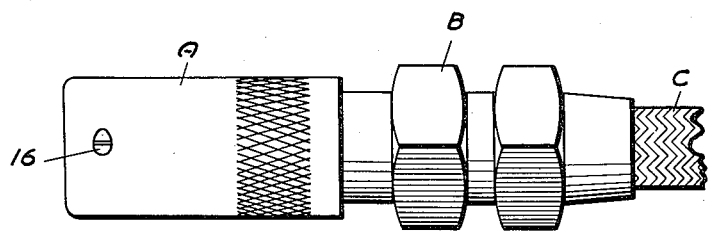
Fig. 1 is a side elevation of a clamp type lubricant discharge nozzle incorporating features of the invention.
Figure 2:
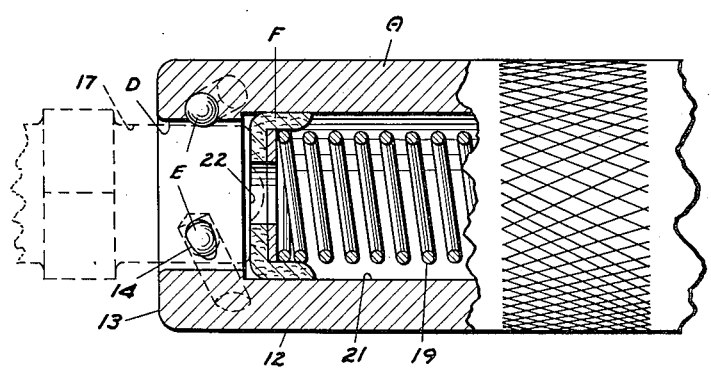
Fig. 2 is an enlarged fragmentary sectional view of the nozzle of Fig. 1.

The axes of the bores 11 not only incline inwardly but also longitudinally of the nozzle as shown in Fig. 2. In this latter inclination the angle of inclination may be greater than the angle of inclination previously mentioned. Measuring this angle from the plane of the outer end of the nozzle to the axis of a bore 11, it may be from 30° to 50° in a preferable form although greater or lesser angles may be found desirable or satisfactory in some instances.

In the present nozzle three of the bores 11 are provided and located at equal distances from one another around the circumference of the body and one of the steel balls E is located in each bore. The balls E may be urged inwardly of the bores by compression springs 15 retained in place by any suitable means such as screw plugs 16 adapted to seat upon shoulders 23 formed by enlarging the threaded or outer ends of the bores 11. The dimensions of the mouths or intersection apertures 14 of the bores are such as to permit the balls E to project within the bore D of the nozzle orifice an amount sufficient frictionally to contact with the outer and cylindrical side wall, such as side walls 17 and 18, of a lubricant receiving fitting when the nozzle is placed over the fitting head as indicated in dotted lines in Fig. 2.

A compression spring 19 located within the rearward and enlarged portion 21 of the nozzle body bore serves to urge the piston-like sealing washer F under a yielding thrust in the direction of a shoulder 22 of the nozzle and to press the washer into sealing engagement with the fitting head. If the spring be of sufficient strength, it may also exert sufficient thrust against the fitting to effect or assist in effecting a clamping engagement between the nozzle and fitting through the wedging action of the balls E confined in their respective forces 11. When lubricant under pressure is admitted to the nozzle, its effect is to impose additional pressure upon the washer F so as to increase the effectiveness of the lubricant seal between the washer and the fitting and, at the same time, to increase the clamping forces acting between the nozzle and fitting. It should be noted that these forces will increase in proportion to the increase in lubricant pressure.

Figures 3, 4, 5:
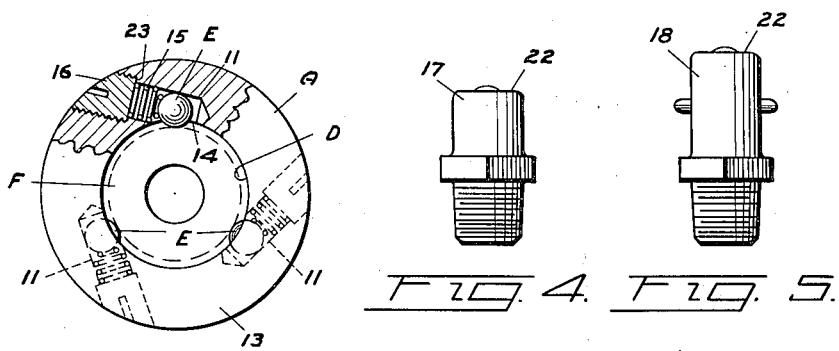
Fig. 3 is a front elevation of the nozzle as shown in Fig. 2, with a portion thereof broken away.
Fig. 4 is an elevation of one type of lubricant receiving fitting adapted to be serviced by the nozzle.
Fig. 5 is a view similar to Fig. 4 of another type of fitting that may be serviced by the nozzle.

In applying the nozzle to either of the fittings of Fig. 4 or 5 it may be helpful to rotate the nozzle in a counter clockwise direction (clockwise viewing Fig. 3) thus tending to urge the balls E outwardly of their bores 11, although it should be sufficient, ordinarily, merely to push the nozzle or coupler onto the fitting. If the balls do not clamp the fitting readily, it may be necessary to rotate the nozzle slightly in a clockwise direction (counter clockwise viewing Fig. 3) to cause the balls E to roll in the bores 11 tightly into engagement with the fitting.

When it is desired to remove the nozzle from the fitting subsequent to the servicing operation, the operator needs only to rotate the nozzle in a counter clockwise direction (clockwise viewing Fig. 3) while withdrawing the nozzle from the fitting head. Sometimes it may be helpful to push slightly upon the nozzle (as when connecting the nozzle and nipple or fitting) while turning the nozzle, to effect a quick release. It will be apparent that the nozzle or coupler may be so modified that coupling and uncoupling rotational movements will be the opposite, respectively, of those described; also rollers may be substituted for the balls.

While a preferred form of the invention has been illustrated and described, it will be apparent that various changes and modifications may be made without departing from the spirit and scope of the invention as claimed.

I claim:

1. A clamp type lubrication coupler comprising, a member providing a socket for the reception of a portion of a fitting, said portion being substantially cylindrical, an elongated recess in said member, said recess intercepting said socket and having its axis of elongation inclined at an angle to the axis thereof, a wedging element disposed in said recess, said element being adapted when moved in one direction within said recess along a path parallel to the axis thereof clampingly to secure said fitting portion when the latter is disposed in said socket, and means normally tending to move said element along said path to the interception of said recess and socket.

2. A clamp type lubrication fitting coupler comprising, a lubricant conducting member adapted to engage the head of a lubricant receiving fitting, and fitting clamping means associated with said conducting member, said means including a member movable in a path inclined to three intersecting planes at right angles to one another.

3. A clamp type lubrication fitting coupler comprising, a lubricant conducting member adapted to engage the head of lubricant receiving fitting, clamping means including a wedge movable in a path intersecting the bore of the nozzle and lying in a plane inclined to the axis of said bore, and means within the orifice of said member for lubricant tight sealing engagement with a lubrication fitting.

4. A clamp type lubrication fitting coupler for servicing a lubricant receiving fitting of the type having cylindrical side walls, comprising, a member adapted to embrace the side walls of said fitting and a plurality of self-acting wedge elements disposed in said member and engageable with the fitting side walls for clamping the nozzle upon the fitting, said elements being movable in paths having components directed toward, along and about the axis of said fitting.

5. In combination, a lubricant receiving fitting of the type having smooth cylindrical side walls, and a nozzle for servicing said fitting, said nozzle comprising, a member having a portion adapted to embrace the side wall of said fitting, a plurality of tracks in said member, said tracks being inclined with respect to three planes perpendicular to one another, one of said planes containing the axis of said member, and a plurality of self-acting rollable wedge members on said tracks in said portion and engageable with the fitting side wall for clamping the nozzle upon the fitting.

6. In combination, a lubricant receiving fitting of the type having smooth side walls parallel to the axis of the fitting and a nozzle for servicing said fitting, said nozzle comprising a member having a portion adapted to embrace the side walls of the fitting, a track in said member, said track being inclined with respect to three planes perpendicular to one another, one of said planes containing the axis of said member, and wedging means including a rollable member on said track in said portion and automatically frictionally engageable with the fitting side walls for clamping the nozzle upon the fitting.

7. In combination, a lubricant receiving fitting of the type having smooth substantially cylindrical side walls and a nozzle for servicing said fitting, said nozzle comprising a member having a portion with a substantially cylindrical bore adapted to receive the fitting therein, and wedging means including a rollable member in said portion frictionally engageable with the fitting side walls for clamping the nozzle upon the fitting, said rollable member being confined in its movement to a path having components directed toward, along and about the axis of the fitting.

8. A clamp type lubrication fitting coupler comprising, a tubular member providing an orifice for the reception of the head of a lubricant receiving fitting, said member having a bore in its side wall inclined to three intersecting planes at right angles to one another, one of said planes containing the axis of said member, a clamping member mounted for movement along the axis of said bore, and means for urging said last named member into frictional engagement with a fitting received in said orifice.

9. A clamp type lubrication fitting coupler comprising, a tubular member providing an orifice for the reception of the lubricant receiving end of a lubricant receiving fitting, said member having bores in its side wall, each of said bores being inclined to three intersecting planes at right angles to one another, one of said planes containing the axis of said member, clamping members mounted for movement along the axis of said bores, means for urging said last named members into frictional engagement with the side wall of a fitting received in said orifice, and pressure responsive means in said member orifice for effecting sealing engagement with the fitting, said pressure responsive means reacting against the end of said fitting thereby tending to increase the clamping effect in proportion to the pressure of lubricant supplied.

10. A clamp type lubrication fitting coupler comprising, a tubular member providing an orifice for the reception of the head of a lubricant receiving fitting, said member having bores in its side wall each of said bores being inclined to three intersecting planes at right angles to one another, one of said planes containing the axis of said member, rollable members mounted for movement along the axis of said bores, and springs disposed in said bores for urging said rollable members into engagement with the walls of the fitting received in said orifice.

JOHN A. WATSON.